L. V. MOULTON & P. A. JONES.

STARTER FOR INTERNAL COMBUSTION ENGINES.

APPLICATION FILED DEC. 2, 1911.

Reissued July 30, 1912.

13,450.

2 SHEETS—SHEET 1.

Witnesses

Harold Van Antwerp

Anna De Windt

Inventors

Luther V. Moulton

Palmer A. Jones

By Luther V. Moulton

Attorney

COLUMBIA PLANOGRAPH CO., WASHINGTON, D. C.

L. V. MOULTON & P. A. JONES.

STARTER FOR INTERNAL COMBUSTION ENGINES.

APPLICATION FILED DEC. 2, 1911.

Reissued July 30, 1912. 13,450.

2 SHEETS—SHEET 2.

Witnesses

Harold V. Van Antwerp

Anna De Windt.

Inventors:

Luther V. Moulton

Palmer A. Jones.

By Luther V. Moulton

Attorney

COLUMBIA PLANOGRAPH CO., WASHINGTON, D. C.

UNITED STATES PATENT OFFICE.

LUTHER V. MOULTON AND PALMER A. JONES, OF GRAND RAPIDS, MICHIGAN.

STARTER FOR INTERNAL-COMBUSTION ENGINES.

13,450. Specification of Reissued Letters Patent. Reissued July 30, 1912.

Original No. 1,004,061, dated September 26, 1911, Serial No. 393,671. Application for reissue filed December 2, 1911. Serial No. 663,876.

*To all whom it may concern:*

Be it known that we, LUTHER V. MOULTON and PALMER A. JONES, citizens of the United States of America, residing at Grand Rapids, in the county of Kent and State of Michigan, have invented certain new and useful Improvements in Starters for Internal-Combustion Engines; and we do hereby declare the following to be a full, clear, and exact description of the invention, such as will enable others skilled in the art to which it appertains to make and use the same.

Our invention relates to improvements in starters for internal combustion engines; and its object is to provide a simple and reliable manually operated device for admitting a fluid under pressure to the engine cylinders; to provide means for automatically controlling the adjustment and movement of said device to properly conform the same to the engine; and to provide the device with various new and useful features hereinafter more fully described and particularly pointed out in the claims.

Figure 1:
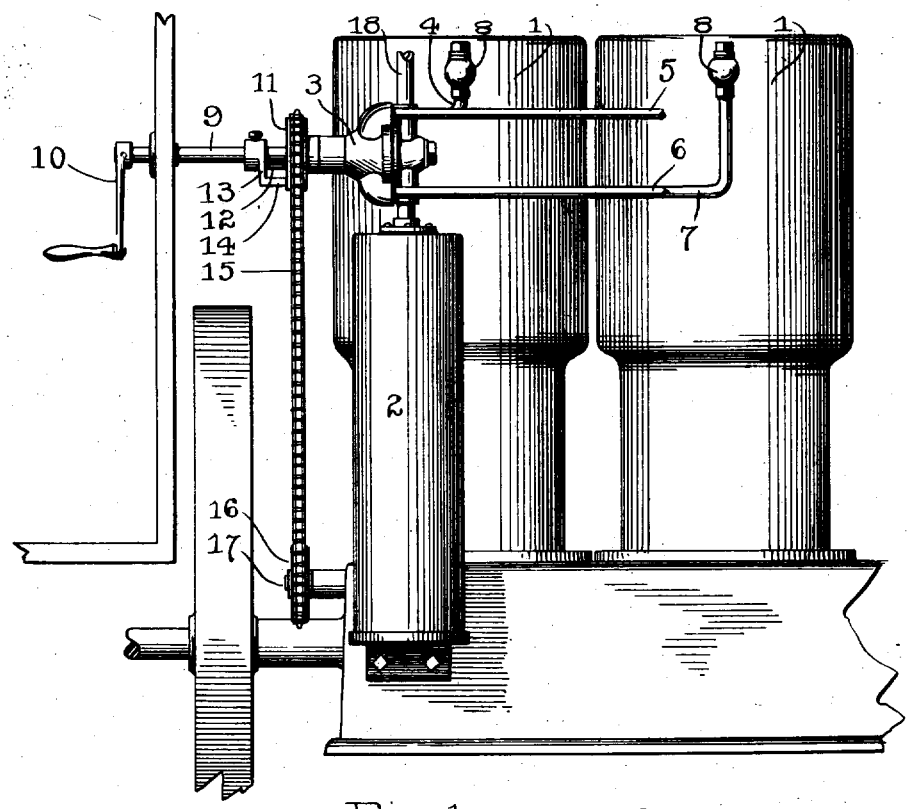
Figure 3:
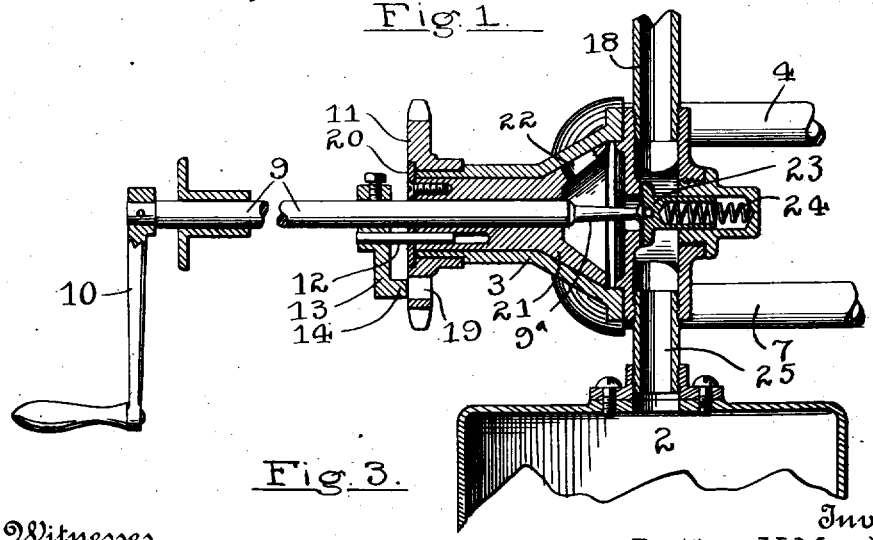
Figure 2:
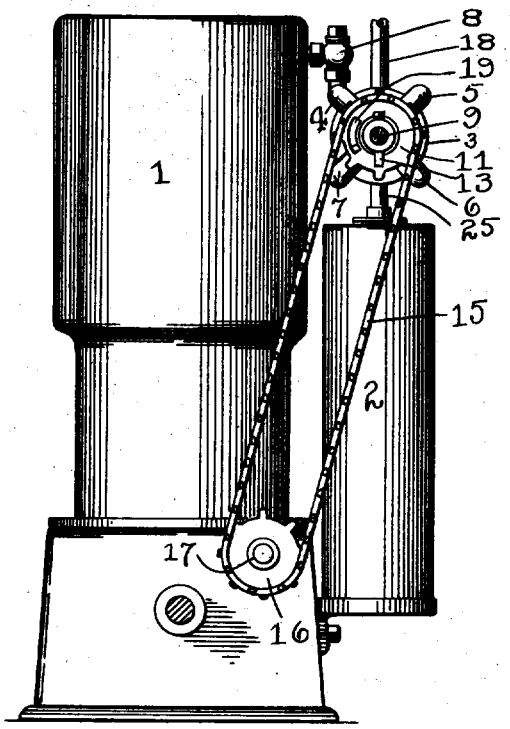
Figure 4:
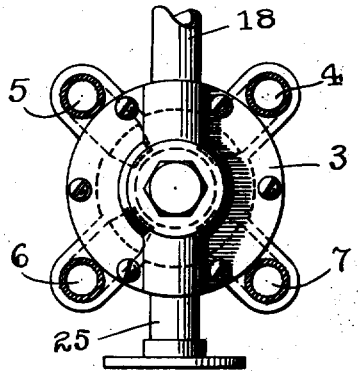
Figure 5:
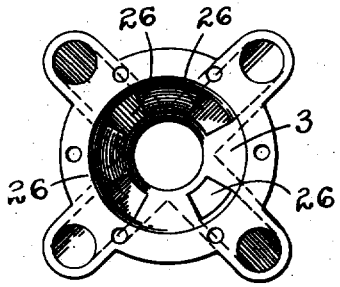
Figure 7:
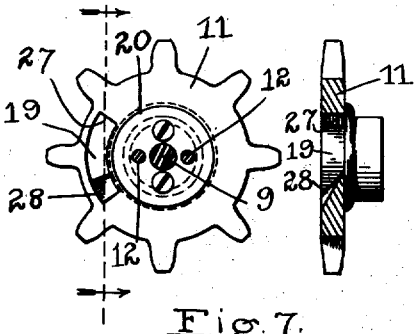
Figure 6:
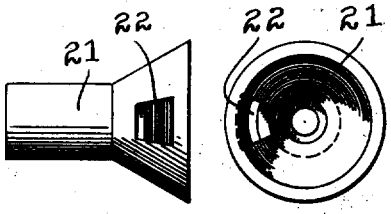
Figure 8:
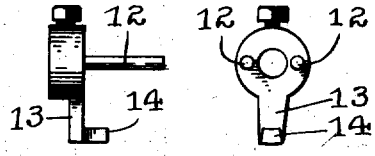

Our device consists essentially of a manually operated valve adapted to successively admit fluid under pressure to the respective cylinders of the engine in the order of the working strokes of their pistons, and means operated by the engine to control the manual adjustment and movement of the valve and the opening and closing of the throttle, as will more fully appear by reference to the accompanying drawings, in which:

Figure 1 is a side elevation of a device embodying our invention; Fig. 2 an end elevation of the same with portions omitted; Fig. 3 an enlarged vertical section of the valve mechanism; Fig. 4 an end elevation of the same; Fig. 5 an end elevation of the valve case; Fig. 6 a detail of the valve proper; Fig. 7 a detail of the mechanically operated valve-adjusting and controlling member; and Fig. 8 a detail of the manually operated valve adjusting and controlling member.

Like numbers refer to like parts in all of the figures.

1—1 represent two of the cylinders of a four cylinder, four cycle, internal combustion engine, the other two cylinders of which are omitted in the drawings; 2 is a tank to receive air or other fluid under pressure to serve for starting the engine; 3 the starting valve case; 4, 5, 6 and 7 pipes or passages extending from the starting valve to the respective engine cylinders. Check valves 8 are provided in said pipes to prevent back pressure when the engine is working.

9 is a rotative and longitudinally movable shaft manually operated by means of a crank 10.

11 represents a constantly rotated adjusting and controlling member mounted concentric with the axis of the shaft 9 and preferably journaled on the tubular portion of the valve case 3. This controller is driven synchronously with the cam shaft 17 of the engine by any suitable means so as to make one revolution to each complete cycle of the engine; the means shown being a sprocket wheel 16 on the cam shaft connected by a chain 15 to a sprocket wheel forming the member 11.

13 is a manually operated valve adjusting and controlling member adapted to co-act with the controller 11 to adjust the valve, to control the rotation thereof and to control the opening of the throttle, for which purpose the controller 11 is provided with a segmental recess or opening 19, and a lug 14 is provided on the member 13 to engage therewith. This opening 19 is elongated to permit of a limited movement of the lug therein and one end of the opening as at 27, presents a square shoulder or stop to the lug 14 and the other end is inclined as at 28, whereby the lug 14 engages the shouldered end 27 to limit the manual rotation of the valve, and is forced out of the opening when brought in contact with the inclined end 28, thus longitudinally moving the shaft and permitting the throttle to close. The lug also traverses the face of the controller 11 to prevent opening the throttle except when the valve 21 is properly adjusted to start the engine, as hereafter described. The valve 21 is preferably conical and has a single opening 22 through which the fluid escapes through the ports and pipes to the cylinders. Longitudinally movable in the axis of this valve is the shaft 9. The adjusting member 13 is fixed on this shaft and is slidably connected with the valve by means of one or more pins 12 whereby the valve 21 and member 13 rotate synchronously. Obviously the valve may be splined to the shaft instead, if preferred. The valve case 3 is provided with ports in the path of the opening 22 in the valve. Each port communicates with a respective cylinder of the engine by means of the pipes 4, 5, 6 and 7 as heretofore described. Thus as the valve is rotated, the opening 22 comes successively opposite the various openings 26 in the order in which the pistons in the various cylinder of the engine perform the working stroke, and is properly controlled in its rotary movement by contact of the lug 14 with the end 27 of the slot 19.

The valve case is closed by a hollow head in communication with the tank 2, by means of a pipe 25, and in this head is a throttle valve 23 to admit the fluid to the valve 21 in line with the shaft 9 and opened by the longitudinal movement of said shaft, which latter has a reduced end engaging and carrying the throttle valve as at 9[a]. This valve 23 is closed by a spring 24, and the shaft 9 by the same means is moved longitudinally to normally disconnect the adjusting and controlling members.

18 is a pipe through which the tank 2 may be charged with compressed fluid in any convenient manner. A washer 20 attached to the end of the valve 21 serves to hold the same in place and to hold the controller 11 on its bearing.

The device operates as follows:—The tank 2 is charged with compressed air or other suitable fluid under pressure by any convenient means and the device so adjusted that when the lug 14 is opposite the opening 19, the opening 22 will be opposite the particular port 26 which communicates with the cylinder in which the piston is on the working stroke, it being understood that the device shown is organized to coöperate with what is known as a four cylinder, four cycle engine. The controller 11 being rotative once to each complete cycle of the engine, this opening 19 will always be so positioned that it will accurately determine the proper adjustment of the valve whenever the lug 14 is brought into the opening 19 and in contact with the end 27 thereof. It will also be noted that the lug 14 traverses the surface of the controller 11 and effectually prevents opening the valve 23 except when the valve 21 is at the right adjustment to properly admit fluid to the proper cylinder of the engine, also that the movement of the engine as it starts, turns the member 11 at the proper speed so that as long as the lug is manually held against the end 27 of the slot, the valve 21 will be properly operated to admit fluid to the cylinders of the engine in succession as each piston therein makes the working stroke. The other three strokes of the pistons being normal to the regular running process, the engine is free to assume the regular running operation, and as soon as the engine is properly started, and the manual operation of the device discontinued, the inclined end 28 of the slot will overtake the lug 14 and move the shaft longitudinally thus automatically closing the throttle 23. If by any chance the engine should stop with the working stroke of a cylinder so nearly complete that admission of the fluid thereto would not carry the engine over the center, and start the same, or the engine stop in such position that the opening 22 comes between two of the ports 26 when the lug 14 is in contact with the end 27 of the slot, then a backward turn of the crank 10 would move the lug 14 backward in the slot 19 and thus open up the next preceding port in the valve case and thus "kick" the engine backward by admission of fluid to the next preceding cylinder, whereupon, a forward movement of the valve would properly start the engine. Usually the lug would first be opposite the face of the controller 11, and thus when turned to find the slot, it would enter the same at the end next the incline. This would automatically find the proper adjustment to make the engine "kick back" if the working piston should be too low to start properly. It thus becomes only necessary in starting the engine, to manually turn the crank 10 and at the same time press on the same to move the shaft longitudinally. The starting operation will thus be practically automatic, the manual operation automatically discontinued and the throttle closed, whenever the engine turns so that the controller 11 overtakes the member 13.

What we claim is:—

1. An engine starter, comprising mechanism for distributing fluid under pressure to the respective engine cylinders in succession, a throttle valve adapted to control the flow of said fluid and manually operated means for simultaneously operating said mechanism and throttle valve.

2. An engine starter, comprising a distributing valve adapted to admit fluid to the engine cylinders in succession, a throttle valve adapted to admit fluid to the distributing valve and a manually operated shaft adapted to simultaneously open the throttle valve and operate the distributing valve.

3. An engine starter, comprising a rotative distributing valve to control the flow of fluid to the respective engine cylinders, a throttle valve to control the flow of fluid to the distributing valve and a manually operated shaft rotative to operate the distributing valve and longitudinally movable to open the throttle valve.

4. An engine starter, comprising a rotary distributing valve, a longitudinally movable throttle valve and a manually operated shaft slidably connected to the distributing valve, rotative to operate the said distributing valve and longitudinally movable to open the throttle valve.

5. An engine starter, comprising a manually operated shaft having rotary and longitudinal movement, a distributing valve slidably mounted on said shaft and rotative therewith and a throttle valve engaged by the end of the shaft and opened by longitudinal movement of the shaft.

6. An engine starter, comprising a distributing valve, a throttle valve, a manually operated shaft rotative to operate the distributing valve and longitudinally movable to operate the throttle valve, an engine-rotated controller and engaging members on the controller and shaft to limit the rotation of the shaft and to move the shaft longitudinally.

7. An engine starter, comprising a manually operated admission valve, a controller adjusted and controlled by the engine, and a member engaging the controller and controlled thereby and connected to the valve to control the movement of the same.

8. An engine starter, comprising an admission valve, means for manually adjusting and operating the same, a controller adjusted and controlled by the engine, and means for detachably connecting the controller and the valve to control the manual adjustment and operation of the same.

9. An engine starter, comprising a throttle valve, an admission valve, a controller adjusted and controlled by the engine, and manually operated means for opening the throttle valve and operating the admission valve, adjusted and controlled by the controller.

10. An engine starter, comprising a manually operated longitudinally movable and rotative shaft, a throttle valve opened by the shaft and an admission valve rotated by the shaft, a controller adjusted and rotated by the engine, and a member on the shaft engaging the controller and interlocking therewith to control the movements of the shaft.

11. In an engine starter, the combination of a manually operated longitudinally movable and rotative shaft, an admission valve rotated by the shaft, a wheel rotated by the engine and having a slot, and an arm fixed on the shaft and having a lug traversing the face of the wheel and engaging the slot to control the movement of the shaft.

12. In an engine starter, the combination of a manually operated rotative and longitudinally movable shaft, an admission valve rotated by the shaft, a wheel rotated by the engine and having a segmental slot presenting a shoulder at one end and an incline at the other end, an arm fixed on the shaft and moving therewith, and a lug on the arm adapted to enter the slot and traversing the face of the wheel to control the movement of the shaft.

13. In an engine starter, the combination of a manually operated admission valve, a manually opened throttle valve, an adjusting and controlling member operated by the engine, and a manually operated member connected to both of said valves to operate the same and also engaging the engine operated member and controlled thereby.

14. In an engine starter, the combination of a manually operated longitudinally movable and rotative shaft, an admission valve rotated by the shaft, a throttle valve opened by the longitudinal movement of the shaft, an adjusting and controlling member rotated by the engine and a member connected to the shaft and engaging the engine-rotated member and controlled thereby.

15. In an engine starter, a manually operated rotative and longitudinally movable shaft, an admission valve rotated by the shaft and slidably connected thereto, a throttle valve engaged by the end of the shaft and opened thereby, a wheel rotated by the engine, an arm fixed on the shaft, and interlocking members on the wheel and arm whereby the wheel determines the adjustment and movement of said valves.

16. In an engine starter, the combination of a manually operated rotative and longitudinally movable shaft, an admission valve slidably connected to the shaft and rotated thereby, a throttle valve engaged by the shaft and opened by the longitudinal movement thereof, a wheel rotated by the engine and having a segmental slot, and an arm fixed on the shaft and having a lug to engage the slot.

17. In an engine starter, the combination of a manually operated rotative and longitudinally movable shaft, an admission valve and a throttle valve operated by the shaft, a wheel rotated by the engine and having a segmental slot presenting a shoulder at one end and an incline at the other end, an arm fixed on the shaft, and a lug on the arm adapted to enter the slot to open the throttle, and engaging the shoulder to limit the movement of the admission valve, and engaging the incline to close the throttle.

18. In an engine starter, in combination with a multiple cylinder internal combustion engine, and a tank to contain fluid under pressure, a valve case having a hollow head communicating with the tank, a throttle valve between the head and case, a rotary admission valve in the case, passages from the case to the respective cylinders of the engine and successively opened by said rotary valve, a manually operated rotary and longitudinally movable shaft slidably connected to the rotary valve and having its end engaging the throttle valve to open the same, a rotary adjusting and controlling member operated by the engine and a member fixed on the shaft and engaging the engine operated member and controlled thereby.

19. In an engine starter, the combination of a manually operated rotative and longitudinally movable shaft, a rotary admission valve concentric with the axis of the shaft and slidable thereon, a throttle valve carried on the end of the shaft and opened thereby, a wheel journaled concentric with the shaft, means for connecting the wheel with the engine to rotate the wheel, said wheel also having a segmental slot therein, an arm fixed on the shaft, a lug on the arm and adapted to engage the slot in the wheel, and a pin slidably connecting the arm and the rotary valve.

In testimony whereof we affix our signatures in presence of two witnesses.

LUTHER V. MOULTON.
PALMER A. JONES.

Witnesses:
HAROLD O. VAN ANTWERP,
ANNA DE WINDT.

Copies of this patent may be obtained for five cents each, by addressing the "Commissioner of Patents. Washington, D. C."